US012783890B2

(12) United States Patent
Kim et al.

(10) Patent No.: US 12,783,890 B2
(45) Date of Patent: Nov. 3, 2026

(54) MULTIPATH MIXING-BASED LEARNING DATA ACQUISITION APPARATUS AND METHOD

(71) Applicant: INDUSTRY-ACADEMIC COOPERATION FOUNDATION, YONSEI UNIVERSITY, Seoul (KR)

(72) Inventors: Seong-Lyun Kim, Seoul (KR); Seung Eun Oh, Seoul (KR); Mehdi Bennis, Oulu (FI); Ji Hong Park, Geelong Vctoria (AU)

(73) Assignee: INDUSTRY-ACADEMIC COOPERATION FOUNDATION, YONSEI UNIVERSITY, Seoul (KR)

( * ) Notice: Subject to any disclaimer, the term of this patent is extended or adjusted under 35 U.S.C. 154(b) by 1137 days.

(21) Appl. No.: 17/847,663

(22) Filed: Jun. 23, 2022

(65) Prior Publication Data

US 2022/0327426 A1 Oct. 13, 2022

Related U.S. Application Data

(63) Continuation of application No. PCT/KR2020/005517, filed on Apr. 27, 2020.

(30) Foreign Application Priority Data

Dec. 31, 2019 (KR) ........................ 10-2019-0179049

(51) Int. Cl.

*G06N 3/084* (2023.01)
*G06N 3/098* (2023.01)
*G06N 20/00* (2019.01)

(52) U.S. Cl.

CPC ............ *G06N 3/084* (2013.01); *G06N 3/098* (2023.01); *G06N 20/00* (2019.01)

(58) Field of Classification Search

CPC ........ G06N 3/084; G06N 3/045; G06N 20/00; G06N 3/08; G06N 3/098; H04L 67/10

(Continued)

(56) References Cited

U.S. PATENT DOCUMENTS

| | | | |
|---|---|---|---|
| 2019/0087689 | A1 | 3/2019 | Chen |
| 2019/0354867 | A1 | 11/2019 | Czarnecki et al. |

FOREIGN PATENT DOCUMENTS

| | | | |
|---|---|---|---|
| JP | 2019-215512 | A | 12/2019 |
| JP | 2019-220114 | A | 12/2019 |
| KR | 10-1979115 | B1 | 5/2019 |

OTHER PUBLICATIONS

Liang, et al., Understanding Mixup Training Methods, Aug. 17, 2018, IEEE,vol. 6 2018. (Year: 2018).*

(Continued)

*Primary Examiner* — Miranda M Huang
*Assistant Examiner* — Yao David Huang

(57) ABSTRACT

The present disclosure provides a learning data acquisition apparatus and method for receiving, from each of a plurality of terminals, mixed data in which a plurality of pieces of learning data are mixed according to a mixing ratio, identifying the mixed data transmitted from each of the plurality of terminals according to an included label, and acquire re-mixed learning data for training a pre-stored learning model by re-mixing each identified label according to a re-mixing ratio configured in correspondence to the number of terminals having transmitted the mixed data, thereby enabling learning performance and security to be improved by re-mixing the mixed data transmitted from each of the plurality of terminals in a data mixing manner.

10 Claims, 4 Drawing Sheets

(58) Field of Classification Search
USPC ............................................................ 706/25
See application file for complete search history.

(56) References Cited

OTHER PUBLICATIONS

Berthelot, et al., Remixmatch: Semi-Supervised Learning With Distribution Alignment and Augmentation Anchoring, Nov. 21, 2019, arXiv, p. 1-13. (Year: 2019).*

Q Yang et al., Federated Machine Learning: Concept and Applications, Jan. 2019, ACM Transactions on Intelligent Systems and Technology, vol. 10, No. 2, Article 12. (Year: 2019).*

Zhang et al., "Mixup: Beyond Empirical Risk Minimization," arXiv:1710.09412v2 [cs.LG] Apr. 27, 2018 (Year: 2018).*

Park et al., "Distilling On-Device Intelligence at the Network Edge," arXiv:1908.05895v1 [cs.IT] Aug. 16, 2019 (Year: 2019).*

Zhao et al., "Federated Learning with Non-IID Data," arXiv:1911.09785v1 [cs.LG] Nov. 21, 2019 (Year: 2019).*

International Search Report and Written Opinion for PCT International Application No. PCT/KR2020/005517 issued from International Search Authority on Sep. 23, 2020.

Bruneau, Pierrick et al., 'Transfer Learning and Mixed Input Deep Neural Network for Estimating Flood Severity in News Content', MediaEval Mutimedia Evaluation Workshop, Oct. 29, 2019. [Retrieved on Sep. 9, 2020] Retrieved from <https://www.researchgate.net/publication/337049946_Transfer_Learning_and_Mixed_Input_Deep_Neural_Networks_for_Estimating_Flood_Severity_in_News_Content> See section 3.3: and figure 1.

* cited by examiner

MULTIPATH MIXING-BASED LEARNING DATA ACQUISITION APPARATUS AND METHOD

CROSS-REFERENCE TO RELATED APPLICATIONS

This application is a continuation of pending PCT International Application No. PCT/KR2020/005517, which was filed on Apr. 27, 2020, and which claims priority from Korean Patent Application No. 10-2019-0179049 filed on Dec. 31, 2019. The entire contents of the aforementioned patent applications are incorporated herein by reference.

BACKGROUND

1. Technical Field

The present disclosure relates to a learning data acquisition apparatus and method, more particularly to a multipath mixing-based learning data acquisition apparatus and method.

2. Description of the Related Art

In order to train an artificial neural network, a large amount of learning data is required, but the number of learning data that an individual terminal can generate or acquire is very limited. In addition, since learning data acquired from individual terminals does not follow an independent identically distributed (hereinafter, iid), and due to the different computing capabilities of each terminal, the size of the learning data that can be trained is limited, there is a limitation that it is difficult to perform high-accuracy learning.

In order to overcome this limitation, recently, a method for training an artificial neural network using a distributed network composed of a plurality of terminals and/or servers has been proposed. If using the distributed network, it is possible to easily acquire a large amount of learning data through data exchange between terminals or between terminal-server by collecting learning data acquired from a plurality of terminals. In addition, since learning data following iid can be acquired, there is an advantage that learning can be performed with high accuracy.

Methods of exchanging data between terminals or between terminal-server include a method of directly exchanging learning data acquired by each terminal, a method of exchanging a learning model, a method of exchanging an output distribution of a learning model, or the like.

However, when each terminal directly exchanges learning data, there is a concern that various information to be protected, such as personal information that may be included in the learning data, may be leaked. And, in the case of a method of exchanging a learning model, since the learning data is not transmitted, the information leakage problem can be solved, however, the size of the data to be transmitted is very large due to the capacity of the learning model. Therefore, transmission is not easy due to the limited transmission capacity of the terminal. Meanwhile, a method of exchanging an output distribution of a learning model can also solve the information leakage problem, and since the size of the data to be transmitted is also small, transmission restrictions can be solved. On the other hand, there is a problem that the accuracy is not improved to a required level during training.

Accordingly, various methods have been proposed for preventing information leakage while reducing transmission capacity and increasing learning accuracy by using a method of directly exchanging learning data. As a method for preventing such information leakage, a method of adding random noise, a method of adjusting a quantization level, a data mixing method and the like are well known. However, when applying such method for preventing information leakage, there is a problem that the amount of data is increased or the learning accuracy is lowered.

SUMMARY

An object of the present disclosure is to provide a learning data acquisition apparatus and method capable of improving learning accuracy while preventing personal information leakage during data transmission for artificial neural network learning in a plurality of terminals of a distributed network.

Another object of the present disclosure is to provide a learning data acquisition apparatus and method capable of improving learning performance by re-mixing mixed data transmitted by a data mixing method from each of a plurality of terminals.

A learning data acquisition apparatus according to an embodiment of the present disclosure, conceived to achieve the objectives above, receives mixed data in which a plurality of learning data are mixed according to a mixing ratio from each of a plurality of terminals, classifies the mixed data transmitted from each of the plurality of terminals according to an included label, and re-mixes each classified label according to a re-mixing ratio configured in correspondence to the number of terminals having transmitted the mixed data, thereby acquiring re-mixed learning data for training a pre-stored learning model.

Each of the plurality of terminals acquires a plurality of sample data for training the learning model, acquires the plurality of learning data by labeling each of the acquired plurality of sample data with a label for classifying the sample data, and mixes the acquired plurality of learning data according to the mixing ratio, thereby acquiring the mixed data.

Each of the plurality of terminals may acquire the mixed data by a weighted sum ($\tilde{\varkappa}=\lambda_1\varkappa_1+\lambda_2\varkappa_2+\ldots+\lambda_n\varkappa_n$) of individual mixing ratios ($\lambda_1, \lambda_2, \ldots \lambda_n$)(wherein, the sum of the individual mixing ratios ($\lambda_1, \lambda_2, \ldots \lambda_n$) is 1 ($\lambda_1+\lambda_2+\ldots+\lambda_n=1$)) corresponding to each of a plurality of learning data ($x_1, x_2, \ldots x_n$).

The individual mixing ratios may be weighted on each of the sample data ($s_1, s_2, s_n$) and labels ($l_1, l_2, \ldots, l_n$) constituting the learning data ($x_1, x_2, \ldots, x_n$).

The learning data acquisition apparatus may re-mix, for each label ($l_1, l_2, \ldots, l_n$) of mixed data ($\tilde{\varkappa}_1, \tilde{\varkappa}_2, \ldots, \tilde{\varkappa}_m$) transmitted from each of a plurality of terminals, while adjusting individual re-mixing ratios ($\tilde{\lambda}_1, \tilde{\lambda}_2, \ldots, \tilde{\lambda}_m$) (wherein, the sum of the individual re-mixing ratios ($\tilde{\lambda}_1, \tilde{\lambda}_2, \ldots, \tilde{\lambda}_m$) 1), thereby acquiring a plurality of re-mixed learning data ($x_1', x_2', \ldots x_n'$).

The learning data acquisition apparatus may input, among re-mixed sample data $s_1's_2', \ldots, s_n'$) and corresponding re-mixed labels ($l_1', l_2', \ldots, l_n$) included in the re-mixed learning data ($x_1', x_2', \ldots x_n'$), the re-mixed sample data $s_1's_2', \ldots, s_n'$) as an input value for training the learning model, and use the re-mixed labels ($l_1', l_2', \ldots, l_n$) as truth values for determining and backpropagating an error of the learning model.

A learning data acquisition method according to another embodiment of the present disclosure, conceived to achieve the objectives above, may comprise the steps of: transmitting, by each of a plurality of terminals, mixed data in which a plurality of learning data are mixed according to a mixing ratio; and classifying the mixed data transmitted from each of the plurality of terminals according to an included label, and re-mixing each classified label according to a re-mixing ratio configured in correspondence to the number of terminals having transmitted the mixed data, thereby acquiring re-mixed learning data for training a pre-stored learning model.

Accordingly, the learning data acquisition apparatus and method according to an embodiment of the present disclosure can improve learning accuracy while preventing personal information leakage during data transmission for artificial neural network learning in a plurality of terminals of a distributed network.

DETAILED DESCRIPTION

Figure 1:
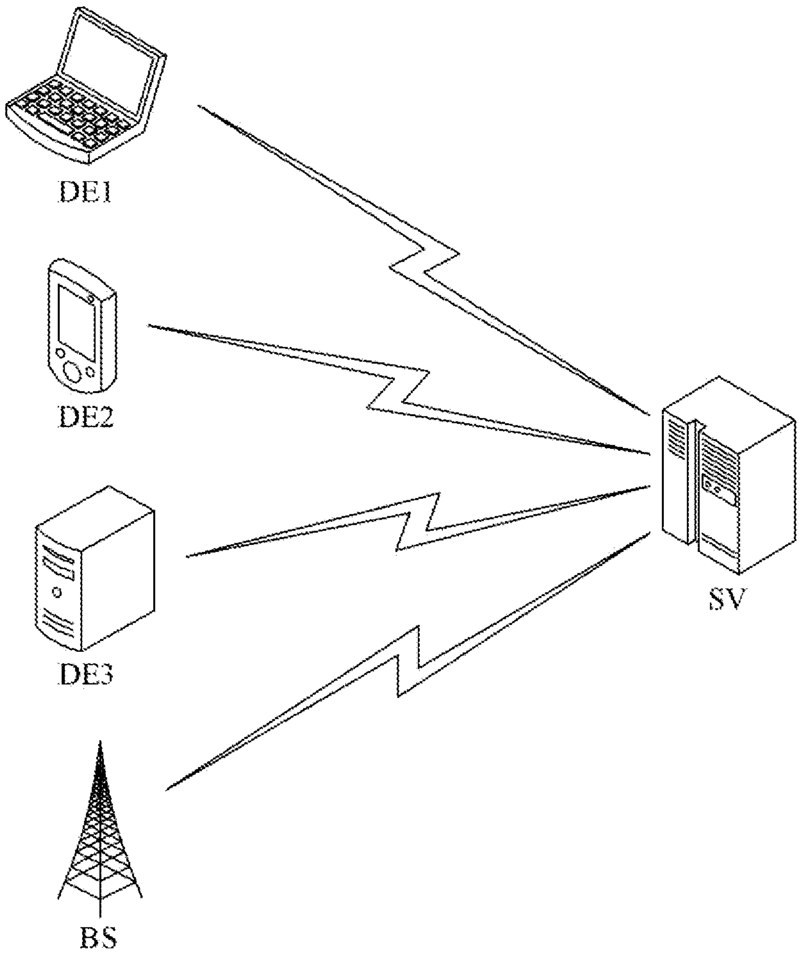
FIG. 1 shows an example of a distributed network for a learning data acquisition apparatus according to an embodiment of the present disclosure.

In order to fully understand the present disclosure, operational advantages of the present disclosure, and objects achieved by implementing the present disclosure, reference should be made to the accompanying drawings illustrating preferred embodiments of the present disclosure and to the contents described in the accompanying drawings.

Hereinafter, the present disclosure will be described in detail by describing preferred embodiments of the present disclosure with reference to accompanying drawings. However, the present disclosure can be implemented in various different forms and is not limited to the embodiments described herein. For a clearer understanding of the present disclosure, parts that are not of great relevance to the present disclosure have been omitted from the drawings, and like reference numerals in the drawings are used to represent like elements throughout the specification.

Throughout the specification, reference to a part "including" or "comprising" an element does not preclude the existence of one or more other elements and can mean other elements are further included, unless there is specific mention to the contrary. Also, terms such as "unit", "device", "module", "block", and the like described in the specification refer to units for processing at least one function or operation, which may be implemented by hardware, software, or a combination of hardware and software.

FIG. 1 shows an example of a distributed network for a learning data acquisition apparatus according to an embodiment of the present disclosure.

Referring to FIG. 1, the distributed network according to the present embodiment includes a plurality of terminals (DE1~DE3). Each of the plurality of terminals (DE1~DE3) acquires pre-designated learning data. Here, each of the plurality of terminals (DE1~DE3) collects sample data available as learning data, and labels what the collected sample data is for training, thereby acquiring learning data. Then, the acquired learning data is not transmitted as it is, but mixed in a pre-designated method according to the data mixing method and transmitted. In the data mixing method, the plurality of terminals (DE1~DE3) acquires mixed data by mixing a plurality of learning data acquired by labeling differently for sample data collected for learning to classify different data at a pre-designated ratio, and transmits the acquired mixed data.

In addition, the distributed network may further include at least one server (SV). The at least one server (SV) may receive the mixed data transmitted from the plurality of terminals (DE1~DE3), and perform learning based on the transmitted mixed data. That is, in the present embodiment, the server (SV) is a device having the ability to perform learning based on mixed data.

That is, at least one of the plurality of terminals (DE1~DE3) may operate as the server (SV), and may exchange the acquired learning data. In addition, each of the plurality of terminals (DE1~DE3) may individually perform learning based on the exchanged mixed data.

Meanwhile, a plurality of terminals (DE1~DE3) and at least one server (SV) may perform communication through at least one base station (BS).

In particular, in the present embodiment, a plurality of terminals (DE1~DE3) or at least one server (SV) may generate re-mixed learning data by mixing the mixed data transmitted from other terminals again in a pre-designated manner, and perform learning using the generated re-mixed learning data, so that it can improve learning performance.

A detailed description of a method for the plurality of terminals (DE1~DE3) to acquire mixed data and a method for re-mixing the transmitted mixed data will be described later.

Figure 2:
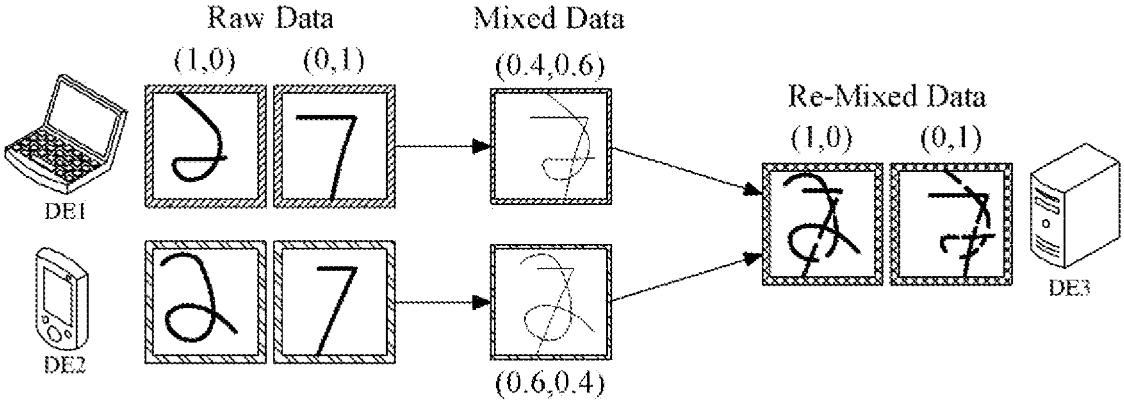
FIG. 2 is a diagram for explaining a concept in which a learning data acquisition apparatus according to an embodiment of the present disclosure acquires learning data based on a multipath mixing method.

FIG. 2 is a diagram for explaining a concept in which a learning data acquisition apparatus according to an embodiment of the present disclosure acquires learning data based on a multipath mixing method.

In FIG. 2, for convenience of explanation, it is assumed that among the plurality of terminals (DE1~DE3), the first and second terminals (DE1, DE2) generate and transmit mixed data, and the third terminal (DE3) generates re-mixed learning data based on the mixed data transmitted from the first and second terminals (DE1, DE2).

Among the plurality of terminals (DE1~DE3), each of the first and second terminals (DE1, DE2) acquires learning data, and transmits the acquired learning data to the third terminal (DE3). At this time, each of a plurality of terminals (DE1, DE2) transmits mixed data by mixing a plurality of learning data with each other in a pre-designated manner, rather than transmitting the acquired plurality of learning data as it is. This is to prevent information that may be included in the learning data from being leaked, as described above.

Each of the first and second terminals (DE1, DE2) acquires sample data for learning a pre-designated classification to be used as learning data, and FIG. 2 illustrates a case in which each terminal acquires the numbers "2" and "7" as sample data ($s_1$, $s_2$) as an example. As shown in FIG. 2, when the terminals (DE1, DE2) acquire two types of numbers as sample data, each of the terminals (DE1, DE2) acquires learning data by labeling labels, indicating what each sample data acquired is sample data for classifying, differently for each type.

Since each of the terminals (DE1, DE2) acquires two types of numbers "2" and "7" as sample data ($s_1$, $s_2$), the sample data ($s_1$) for the number "2" was labeled with a label ($l_1$=(1, 0)) according to the number of classifications of the sample data acquired, and the sample data ($s_2$) for the number "7" was labeled with a label ($l_2$=(0, 1)). However, as another example, if assuming that 10 numbers from 0 to 9 are acquired as sample data ($s_0$~$s_9$), each of the terminals (DE1, DE2) may label the labels ($l_2$, $l_7$) for the acquired sample data ($s_2$, $s_7$) "2" and "7" as (0, 0, 1, 0, 0, 0, 0, 0, 0, 0) and (0, 0, 0, 0, 0, 0, 0, 1, 0, 0), respectively. That is, each of the terminals (DE1, DE2) labels a label corresponding to the acquired sample data according to the number of classifications of the sample data designated to be acquired, thereby acquiring learning data in which sample data and labels are paired.

Here, since each of the terminals (DE1, DE2) acquires two kinds of numbers "2" and "7" as sample data ($s_1$, $s_2$) and labels the corresponding labels ($l_1$, $l_2$), the learning data ($x_1$, $x_2$) in which sample data and labels are paired can be acquired as $x_1=(s_1, l_1)$, $x_2=(s_2, l_2)$, respectively.

In addition, the first and second terminals (DE1, DE2) generate mixed data by mixing learning data ($x_1$, $x_2$) consisting of pairs of sample data ($s_1$, $s_2$) and labels ($l_1$, $l_2$) in a pre-designated manner. Here, the first and second terminals (DE1, DE2) acquire mixed data by mixing a plurality of different learning data ($x_1$, $x_2$) as in Equation 1 according to a mixing ratio ($\lambda=(\lambda_1, \lambda_2)$).

$$\tilde{x}=\lambda_1 x_1+\lambda_2 x_2 \quad \text{[Equation 1]}$$

wherein, the sum of the individual mixing ratios ($\lambda_1$, $\lambda_2$) is 1 ($\lambda_1+\lambda_2=1$). Therefore, Equation 1 can be expressed as Equation 2.

$$\tilde{x}=\lambda_1 x_1+(1-\lambda_1)x_2$$

FIG. 2 illustrates a case in which the first terminal (DE1) mixes by setting the mixing ratios ($\lambda_1$, $\lambda_2$) for the two learning data ($x_1$, $x_2$) to 0.4 and 0.6, respectively, and the second terminal (DE2) mixes by setting the mixing ratios ($\lambda_1$, $\lambda_2$) for the two learning data ($x_1$, $x_2$) to 0.6 and 0.4, respectively. That is, the images of the numbers "2" and "7" are mixed according to the mixing ratios ($\lambda_1$, $\lambda_2$) of 0.6 and 0.4, respectively.

The mixing ratio ($\lambda=(\lambda_1, \lambda_2)$) is a weight for adjusting the weight of each sample data when synthesizing the sample data ($s_1$, $s_2$) of the learning data ($x_1$, $x_2$). The mixing ratio is weighted not only on the sample data ($s_1$, $s_2$) but also on the labels ($l_1$, $l_2$) corresponding to the sample data ($s_1$, $s_2$). That is, the mixing ratio ($\lambda_1$, $\lambda_2$) is also weighted on the labels ($l_1$, $l_2$), so that in the first terminal (DE1), the weighted labels ($\lambda_1 l_1$, $\lambda_2 l_2$) are (0.4, 0) and (0, 0.6), respectively, and in the second terminal (DE2), the weighted labels ($\lambda_1 l_1$, $\lambda_2 l_2$) are (0.6, 0) and (0.4, 0), respectively. In addition, in the mixed data ($\tilde{x}$) the weighted labels are combined, so that the label to which the mixing ratio ($\lambda_1$, $\lambda_2$) of the mixed data ($\tilde{x}_1$) of the first terminal (DE1) is weighted becomes (0.4, 0.6), and the label to which the mixing ratio ($\lambda_1$, $\lambda_2$) of the mixed data ($\tilde{x}_2$) of the second terminal (DE2) is weighted becomes (0.6, 0.4).

In the above, it has been described as generating the mixed data ($\tilde{x}_2$) as in Equation 1, assuming that each terminal acquires two types of sample data, however when the terminals (DE1, DE2) are designated to acquire n types of learning data ($x_1$, $x_2$, . . . the mixed data ($\tilde{x}_2$) can be acquired in a generalized manner as in Equation 3.

$$\tilde{x}=\lambda_1 x_1+\lambda_2 x_2+\ldots+\lambda_n x_n \quad \text{[Equation 3]}$$

wherein, the sum of the individual mixing ratios ($\lambda_1$, $\lambda_2$, . . . , $\lambda_n$) is 1 ($\lambda_1+\lambda_2+\ldots+\lambda_n=1$).

The third terminal (DE3) receives mixed data ($\tilde{x}_1$, $\tilde{x}_2$) from each of the first and second terminals (DE1, DE2), and re-mixes a plurality of received mixed data ($\tilde{x}_1$, $\tilde{x}_2$) in a pre-designated manner, thereby acquiring re-mixed learning data (x').

When m pieces of mixed data ($\tilde{x}_1$, $\tilde{x}_2$, . . . , $\tilde{x}_m$) are transmitted from m terminals, the third terminal (DE3) re-mixes as shown in Equation 4 by applying m re-mixing ratios ($\tilde{\lambda}_1$, $\tilde{\lambda}_2$, . . . , $\tilde{\lambda}_m$) to each of the transmitted m pieces of mixed data ($\tilde{x}_1$, $\tilde{x}_2$, . . . , $\tilde{x}_m$).

$$x'=\tilde{\lambda}_1\tilde{x}_1+\tilde{\lambda}_2\tilde{x}_2+\ldots+\tilde{\lambda}_m\tilde{x}_m \quad \text{[Equation 4]}$$

wherein, the sum of the m re-mixing ratios ($\tilde{\lambda}_1$, $\tilde{\lambda}_2$, . . . , $\tilde{\lambda}_m$) is 1 ($\tilde{\lambda}_1+\tilde{\lambda}_2+\ldots+\tilde{\lambda}_m=1$). At this time, the third terminal (DE3) may acquire a number of re-mixed learning data ($x_1'$, $x_2'$, . . . $x_n'$) corresponding to the number (n) of learning data ($x_1$, $x_2$, . . . $x_n$) that each of the terminals (DE1, DE2) applies to generate the mixed data, rather than acquiring one re-mixed learning data (x') according to Equation 4.

The re-mixed label (l') of the re-mixed learning data (x') satisfies the re-mixed label ($l'=l_k$ (wherein, $k \in \{1, 2, \ldots, m\}$)) corresponding to m re-mixing ratios ($\tilde{\lambda}_1$, $\tilde{\lambda}_2$, . . . , $\tilde{\lambda}_m$).

That is, according to the labels ($l_1$, $l_2$, . . . , $l_n$) of each of the transmitted m pieces of mixed data ($\tilde{x}_1$, $\tilde{x}_2$, . . . , $\tilde{x}_m$), the re-mixed label ($l_k$) of m re-mixing ratios ($\tilde{\lambda}_1$, $\tilde{\lambda}_2$, . . . , $\tilde{\lambda}_m$) is applied while changing the labels ($\tilde{l}_1$, $l_2$, . . . , $\tilde{l}_n$) of each of the m pieces of mixed data ($\tilde{x}_1$, $\tilde{x}_2$, . . . , $\tilde{x}_m$) thereby acquiring n pieces of re-mixed learning data ($x_1'$, $x_2'$, $x_n'$).

That is, when assuming that the number of sample data acquired by each of the m terminals is n, the third terminal (DE3) may acquire n pieces of re-mixed learning data ($x_1'$, $x_2'$, . . . $x_n'$).

As in FIG. 2, when each of two (m=2) terminals (DE1, DE2) mixes two (n=2) learning data ($x_1$, $x_2$), and transmits the mixed data ($\tilde{x}_1$, $\tilde{x}_2$), the two re-mixing ratios ($\tilde{\lambda}_1$, $\tilde{\lambda}_2$) can be calculated by Equations 5 and 6 using Equation 3, for the case where the label is 1 and 2, respectively.

$$\tilde{\lambda}_1 = 1-\tilde{\lambda}_2 = \frac{\lambda_1}{2\lambda_1-1}, \text{ then } l'=l_1 \quad \text{[Equation 5]}$$

$$\tilde{\lambda}_1 = 1-\tilde{\lambda}_2 = 1-\frac{\lambda_1}{2\lambda_1-1}, \text{ then } l'=l_2 \quad \text{[Equation 6]}$$

The above-described re-mixing yields a result substantially similar to re-classifying the mixed data ($\tilde{x}_1$, $\tilde{x}_2$) according to each label. That is, it operates similarly to inverse mixing on the mixed data ($\tilde{x}_1$, $\tilde{x}_2$), so the re-mixed learning data ($x_1'$, $x_2'$, . . . $x_n'$) can also be viewed as inverse mixed learning data.

In addition, the third terminal (DE3) may train a learning model implemented with an artificial neural network based on the acquired n pieces of re-mixed learning data ($x_1'$, $x_2'$, . . . $x_n'$).

The acquired n pieces of re-mixed learning data ($x_1'$, $x_2'$, . . . $x_n'$) are respectively composed of a combination of re-mixed sample data ($s_1'$, $s_2$, . . . $s_n$) and re-mixed labels ($l_1'$, $l_2'$, . . . $l_n'$) corresponding to the re-mixed sample data ($s_1'$, $s_2'$, . . . $s_n'$). Here, the re-mixed sample data ($s_1'$, $s_2'$, . . . $s_n'$) may be used as an input value of the learning model, and the re-mixed labels ($l_1'$, $l_2'$, . . . $l_n'$) may be used as truth values for determining and backpropagating an error of the learning model.

Figure 3A:
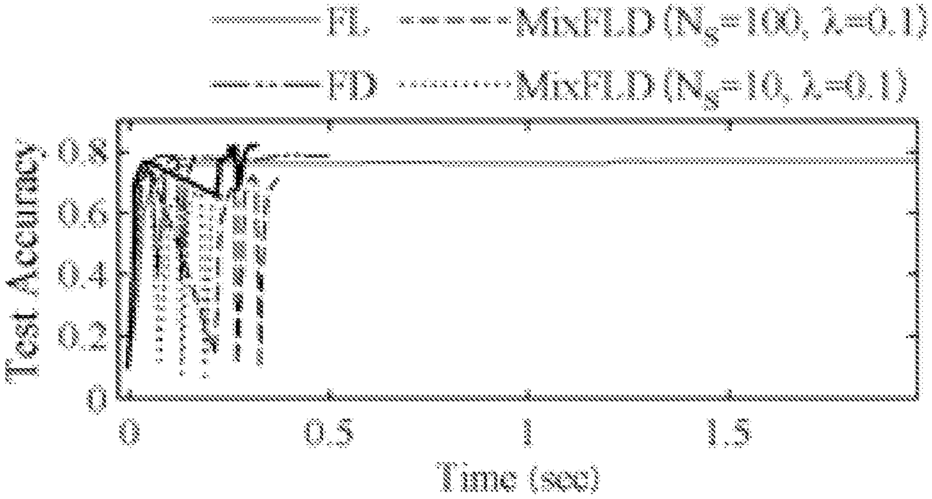
FIGS. 3A and 3B show a result of evaluating learning accuracy when learning is performed using the re-mixed learning data according to the present embodiment.
Figure 3B:
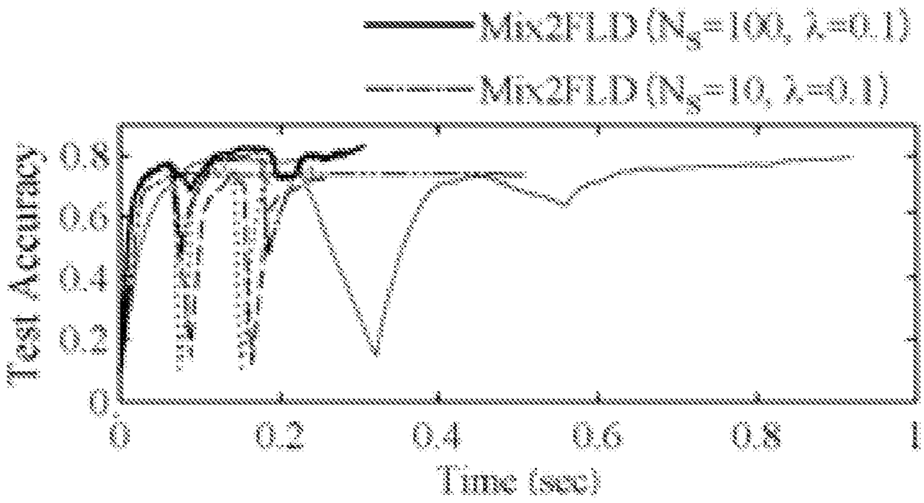

FIGS. 3A and 3B show a result of evaluating learning accuracy when learning is performed using the re-mixed learning data according to the present embodiment.

In FIG. 3A shows a case where uplink and downlink channel capacities are asymmetric, and FIG. 3B shows a case where uplink and downlink channel capacities are symmetric. In addition, in FIGS. 3A and 3B, Mix2FLD represents a result of learning using re-mixed learning data ($x_1'$, $x_2'$, . . . $x_n'$) according to the present embodiment, MixFLD represents a result of learning using mixed data ($\tilde{x}_1, \tilde{x}_2, \ldots, \tilde{x}_m$) transmitted from the terminal, and FL and FD represent results of learning according to a method of exchanging a learning model and a method of exchanging an output distribution of a learning model, respectively.

As shown in FIGS. 3A and 3B, it can be seen that, when learning is performed by receiving mixed data ($\tilde{x}_1, \tilde{x}_2, \ldots, \tilde{x}_m$) from terminals, re-mixing the received mixed data ($\tilde{x}_1, \tilde{x}_2, \ldots, \tilde{x}_m$), and using the generated re-mixed learning data ($x_1'$, $x_2'$, . . . $x_n'$), as in the present embodiment, the learning performance is very excellent compared to the case of using the mixed data ($\tilde{x}_1, \tilde{x}_2, \ldots, \tilde{x}_m$) as it is, or a method of exchanging a learning model and a method of exchanging an output distribution of a learning model.

TABLE 1

| | Sample Privacy Under Mixing Ratio λ | | | | | |
|---|---|---|---|---|---|---|
| Dataset | λ = 0 | 0.1 | 0.2 | 0.3 | 0.4 | 0.5 |
| MNIST | 2.163 | 4.465 | 5.158 | 5.564 | 5.852 | 6.055 |
| FMNIST | 1.825 | 4.127 | 4.821 | 5.226 | 5.514 | 5.717 |
| CIFAR-10 | 2.582 | 4.884 | 5.577 | 5.983 | 6.270 | 6.473 |
| CIFAR-100 | 2.442 | 4.744 | 5.438 | 5.843 | 6.131 | 6.334 |

TABLE 2

| | Sample Privacy Under Mixing Ratio λ | | | | | |
|---|---|---|---|---|---|---|
| Dataset | λ = 0 | 0.1 | 0.2 | 0.3 | 0.4 | 0.499 |
| MNIST | 2.557 | 4.639 | 5.469 | 6.140 | 7.007 | 9.366 |
| FMNIST | 2.196 | 4.568 | 5.410 | 6.143 | 6.925 | 9.273 |
| CIFAR-10 | 2.824 | 5.228 | 6.076 | 6.766 | 7.662 | 10.143 |
| CIFAR-100 | 2.737 | 5.151 | 6.050 | 6.782 | 7.652 | 10.104 |

Tables 1 and 2 show the results of calculating guarantee information for security such as privacy, in the case of using the mixed data ($\tilde{x}_1, \tilde{x}_2, \ldots, \tilde{x}_m$) and the case of using the re-mixed learning data ($x_1'$, $x_2'$, . . . $x_n'$) according to the present embodiment, respectively.

In Tables 1 and 2, the results were calculated by taking the log of the minimum Euclidean distance between the sample data ($s_1$, $s_2$) acquired by each terminal and the mixed data ($\tilde{x}_1, \tilde{x}_2, \ldots, \tilde{x}_m$) or the re-mixed learning data ($x_1'$, $x_2'$, . . . $x_n'$).

Comparing Tables 1 and 2, it can be seen that the security is greatly improved when the re-mixed learning data ($x_1'$, $x_2'$, . . . $x_n'$) is used rather than when the mixed data ($\tilde{x}_1, \tilde{x}_2, \ldots, \tilde{x}_m$) is used.

Figure 4:
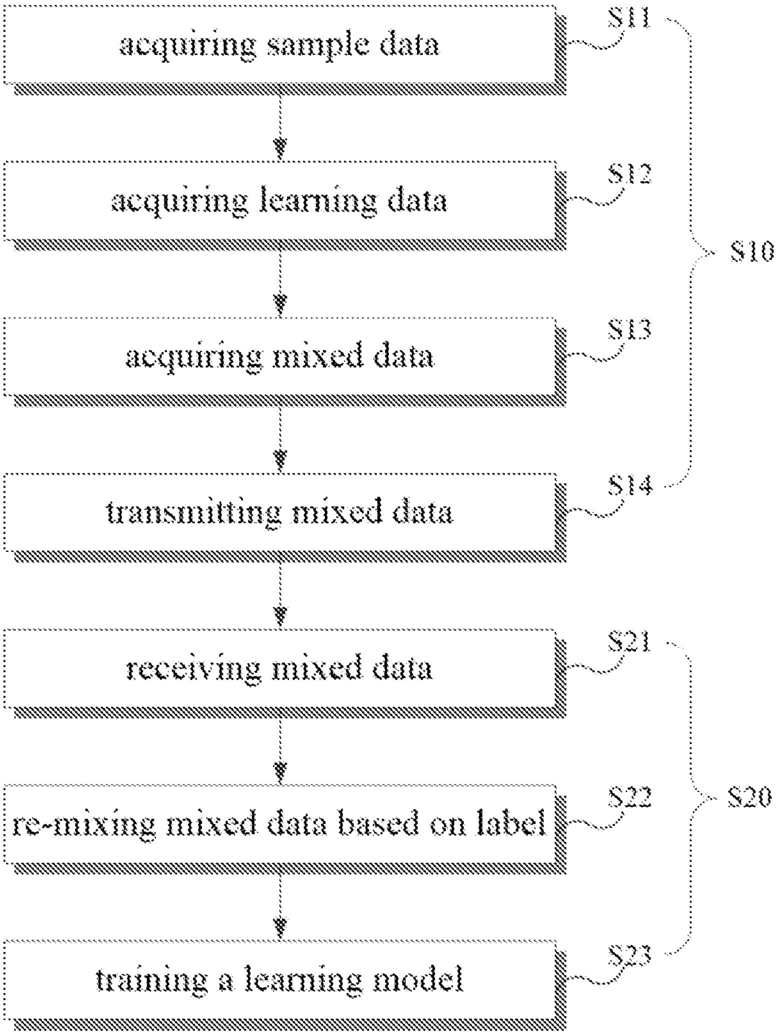
FIG. 4 shows a learning data acquisition method according to an embodiment of the present disclosure.

FIG. 4 shows a learning data acquisition method according to an embodiment of the present disclosure.

When the learning data acquisition method of FIG. 4 is described with reference to FIG. 2, the learning data acquisition method according to the present embodiment may be largely composed of a mixed data acquisition step (S10) in which each of a plurality of terminals on a distributed network acquires sample data for training a learning model, and generates and transmits mixed data with enhanced security from the acquired sample data, and a re-mixed learning data acquisition step (S20) of re-mixing a plurality of mixed data transmitted from a plurality of terminals, similar to the process of generating mixed data from a plurality of sample data, to acquire re-mixed learning data.

In the mixed data acquisition step (S10), first, each of a plurality of terminals ($DE_1$, $DE_2$, . . . , $DE_m$) on the distributed network acquires a plurality of sample data ($s_1$, $s_2$, . . . $s_n$) for training a learning model (S11). At this time, each of a plurality of terminals ($DE_1$, $DE_2$, . . . , $DE_m$) may acquire different types of sample data ($s_1$, $s_2$, . . . , $s_n$) for pre-designated different types of learning. Then, when a plurality of sample data ($s_1$, $s_2$, . . . , $s_n$) are acquired, a plurality of learning data ($x_1$, $x_2$, . . . , $x_n$) is acquired (S12), by labeling each sample data with a label ($l_1$, $l_2$, . . . , $l_n$) corresponding to each type of the acquired sample data ($s_1$, $s_2$, $s_n$).

Each of terminals ($DE_1$, $DE_2$, . . . , $DE_m$) mixes according to the mixing ratio ($\lambda=(\lambda_1, \lambda_2, \ldots, \lambda_n)$) for a plurality of acquired learning data ($x_1$, $x_2$, . . . , $x_n$), thereby acquiring mixed data ($\tilde{x}$)(S13). Each of terminals ($DE_1$, $DE_2$, . . . , $DE_m$) may mix a plurality of learning data ($x_1$, $x_2$, . . . , $x_n$) according to different pre-designated or arbitrary mixing ratios ($\lambda=(\lambda_1, \lambda_2, \ldots \lambda_n)$), thereby acquiring mixed data ($\tilde{x}_1, \tilde{x}_2, \ldots, \tilde{x}_m$) corresponding to each of the terminals ($DE_1$, $DE_2$, . . . , $DE_m$).

Then, each of the terminals ($DE_1$, $DE_2$, . . . , $DE_m$) transmits the acquired mixed data ($\tilde{x}_1, \tilde{x}_2, \ldots, \tilde{x}_m$) to another terminal or at least one server (S14).

Meanwhile, in the re-mixed learning data acquisition step (S20), first, a terminal or server receives a plurality of mixed data ($\tilde{x}_1, \tilde{x}_2, \ldots, \tilde{x}_m$) transmitted from other terminals ($DE_1$, $DE_2$, . . . , $DE_m$) (S21). Then, by classifying the plurality of received mixed data ($\tilde{x}_1, \tilde{x}_2, \ldots, \tilde{x}_m$) according to the label ($l_1$, $l_2$, . . . , $l_n$) and re-mixing by applying m re-mixing ratios ($\tilde{\lambda}_1, \tilde{\lambda}_2, \ldots, \tilde{\lambda}_m$) to each classified label unit, the re-mixed learning data ($x_1'$, $x_2'$, . . . $x_n'$) is acquired (S22).

When the re-mixed learning data ($x_1'$, $x_2'$, . . . $x_n'$) is acquired, a learning model is trained using the acquired re-mixed learning data ($x_1'$, $x_2'$, . . . $x_n'$) as learning data for a pre-designated learning model. At this time, the label of the re-mixed learning data ($x_1'$, $x_2'$, . . . $x_n'$) is a classification value for the type trained by the re-mixed learning data ($x_1'$, $x_2'$, . . . $x_n'$), and can train a learning model in a supervised learning method.

A learning data acquisition apparatus described above may be implemented as a hardware component, a software component, and/or a combination of hardware components and software components. For example, the apparatus and components described in the embodiments may be achieved using one or more general purpose or special purpose computers, such as, for example, a processor, a controller, an arithmetic logic unit (ALU), a digital signal processor, a microcomputer, a field programmable gate array (FPGA), a programmable logic unit (PLU), a microprocessor, or any other device capable of executing and responding to instructions. The processing device may execute an operating system (OS) and one or more software applications executing on the operating system. In addition, the processing device may access, store, manipulate, process, and generate data in response to execution of the software. For ease of understanding, the processing apparatus may be described as being used singly, but those skilled in the art will recognize that the processing apparatus may include a plurality of processing elements and/or a plurality of types of processing elements. For example, the processing apparatus may include a plurality of processors or one processor and one controller. Other processing configurations, such as a parallel processor, are also possible.

The software may include computer programs, code, instructions, or a combination of one or more of the foregoing, configure the processing apparatus to operate as desired, or command the processing apparatus, either independently or collectively. In order to be interpreted by a processing device or to provide instructions or data to a processing device, the software and/or data may be embodied permanently or temporarily in any type of a machine, a component, a physical device, a virtual device, a computer storage medium or device, or a transmission signal wave. The software may be distributed over a networked computer system and stored or executed in a distributed manner. The software and data may be stored in one or more computer-readable recording media.

A method according to the present disclosure can be implemented in the form of a program command that can be executed through various computer means and recorded in a computer-readable medium or as a computer program stored in a medium for execution on a computer. The computer-readable medium can store program commands, data files, data structures or combinations thereof. The program commands recorded in the medium may be specially designed and configured for the present disclosure or be known to those skilled in the field of computer software. Here, the computer-readable medium can be an arbitrary medium available for access by a computer, where examples can include all types of computer storage media. Examples of a computer storage medium can include volatile and non-volatile, detachable and non-detachable media implemented based on an arbitrary method or technology for storing information such as computer-readable instructions, data structures, program modules, or other data, and can include ROM (read-only memory), RAM(random access memory), CD-ROM's, DVD-ROM's, magnetic tapes, floppy disks, optical data storage devices, etc. Examples of the program commands include machine language code generated by a compiler and high-level language code executable by a computer using an interpreter and the like. The hardware devices described above may be configured to operate as one or more software modules to perform the operations of the embodiments, and vice versa.

While the present disclosure is described with reference to embodiments illustrated in the drawings, these are provided as examples only, and the person having ordinary skill in the art would understand that many variations and other equivalent embodiments can be derived from the embodiments described herein.

Therefore, the true technical scope of the present disclosure is to be defined by the technical spirit set forth in the appended scope of claims.

What is claimed is:

1. A learning data acquisition apparatus, comprising: at least one processor; and a memory storing a learning model, wherein the at least one processor is configured to:

receive, from each of a plurality of terminals, mixed data in which a plurality of pieces of learning data are mixed according to a mixing ratio configured for security;

classify the mixed data received from each terminal based on a label included in the mixed data;

determine a re-mixing ratio as a reciprocal of a total number of the plurality of terminals from which the mixed data has been received, to transform a non-independent identically distributed (non-I.I.D.) data distribution into an independent identically distributed (I.I.D.) distribution for training of the learning model;

acquire re-mixed learning data by re-mixing each classified label according to the determined re-mixing ratio using the reciprocal as a weight; and train the learning model by backpropagating an error determined using the re-mixed learning data, thereby improving convergence of the learning model.

2. The learning data acquisition apparatus according to claim 1, wherein each of the plurality of terminals acquires a plurality of sample data for training the learning model, acquires the plurality of learning data by labeling each of the acquired plurality of sample data with a label for classifying the sample data, and mixes the acquired plurality of learning data according to the mixing ratio, thereby acquiring the mixed data.

3. The learning data acquisition apparatus according to claim 2, wherein each of the plurality of terminals acquires the mixed data by a weighted sum $\tilde{x}=\lambda_1 x_1+\lambda_2 x_2+ \ldots \lambda_n x_n)$ of individual mixing ratios $(\lambda_1, \lambda_2, \ldots, \lambda_n)$ (wherein, the sum of the individual mixing ratios $(\lambda_1, \lambda_2, \ldots, \lambda_n)$ is 1 $(\lambda_1+\lambda_2+ \ldots +\lambda_n=1)$) corresponding to each of a plurality of learning data $(x_1, x_2, \ldots, x_n)$.

4. The learning data acquisition apparatus according to claim 3, wherein the individual mixing ratios are weighted on each of the sample data $(s_1, s_2, \ldots, s_n)$ and labels $(I_1, I_2, \ldots, I_n)$ constituting the learning data $(x_1, x_2, \ldots, x_n)$.

5. The learning data acquisition apparatus according to claim 4, wherein the learning data acquisition apparatus re-mixes, for each label $(I_1, I_2, \ldots, I_n)$ of mixed data $(\tilde{x}_1, \tilde{x}_2, \ldots, \tilde{x}_m)$ transmitted from each of a plurality of terminals, while adjusting individual re-mixing rations $(\tilde{\lambda}_1, \tilde{\lambda}_2, \ldots, \tilde{\lambda}_m)$ (wherein, the sum of the individual re-mixing ratios $(\tilde{\lambda}_1, \tilde{\lambda}_2, \ldots, \tilde{\lambda}_m)$ is 1), thereby acquiring a plurality of re-mixed learning data $(x_1, x_2', \ldots, x_n')$.

6. A learning data acquisition method performed by a computing device in a distributed network, comprising the steps of:

receiving, from each of a plurality of terminals, mixed data in which a plurality of pieces of learning data are mixed according to a mixing ratio configured for security;

classifying, by a processor, the mixed data received from each terminal based on a label included in the mixed data;

determining, by the processor, a re-mixing ratio as a reciprocal of a total number of the plurality of terminals from which the mixed data was received, to transform a non-independent identically distributed (non-I.I.D.) data distribution into an independent identically distributed (I.I.D.) distribution;

acquiring re-mixed learning data by re-mixing each classified label according to the determined re-mixing ratio using the reciprocal as a weight; and updating parameters of a learning model by backpropagating an error determined using the re-mixed learning data, thereby improving convergence of the learning model.

7. The learning data acquisition method according to claim 6, wherein the step of transmitting mixed data comprises the steps of:

acquiring a plurality of sample data for training the learning model;

acquiring the plurality of learning data by labeling each of the acquired plurality of sample data with a label for classifying the sample data; and acquiring the mixed data by mixing the acquired plurality of learning data according to a mixing ratio.

8. The learning data acquisition method according to claim 7, wherein the step of acquiring the mixed data acquires the mixed data by a weighted sum) ($\tilde{x}=\lambda_1 x_1+\lambda_2 x_2+\ldots+\lambda_n x_n$) of individual mixing ratios ($\lambda_1, \lambda_2, \ldots, \lambda_n$) corresponding to each of a plurality of learning data ($x_1, x_2, \ldots, x_n$).

9. The learning data acquisition method according to claim 8, wherein the individual mixing ratios are weighted on each of the sample data ($s_1, s_2, \ldots, s_n$) and labels ($I_1, I_2, \ldots, I_n$) constituting the learning data ($x_1, x_2, \ldots, x_n$).

10. The learning data acquisition method according to claim 9, wherein the step of acquiring re-mixed learning data re-mixes, for each label ($I_1, I_2, \ldots, I_n$) of mixed data ($x_1, x_2, \ldots, x_m$) transmitted from each of a plurality of terminals, while adjusting individual re-mixing ratios ($\tilde{\lambda}_1, \tilde{\lambda}_2, \ldots, \tilde{\lambda}_m$), thereby acquiring a plurality of re-mixed learning data ($x_1', x_2', \ldots, x_n'$).

* * * * *